US012683989B2

(12) United States Patent
Miran et al.

(10) Patent No.: US 12,683,989 B2
(45) Date of Patent: *Jul. 14, 2026

(54) TECHNIQUES FOR MULTI-TENANT VULNERABILITY SCANNING UTILIZING SENSITIVE DATA

(71) Applicant: Wiz, Inc., New York, NY (US)

(72) Inventors: Yarin Miran, Rishon Lezion (IL); Ami Luttwak, Binyamina (IL); Roy Reznik, Tel Aviv (IL); Avihai Berkovitz, Tel Aviv (IL); Moran Cohen, Tel Aviv (IL); Yaniv Shaked, Tel Aviv (IL); Yaniv Joseph Oliver, Tel Aviv (IL)

(73) Assignee: Wiz, Inc., New York, NY (US)

( * ) Notice: Subject to any disclaimer, the term of this patent is extended or adjusted under 35 U.S.C. 154(b) by 39 days.

This patent is subject to a terminal disclaimer.

(21) Appl. No.: 18/672,768

(22) Filed: May 23, 2024

(65) Prior Publication Data

US 2024/0314147 A1     Sep. 19, 2024

Related U.S. Application Data

(63) Continuation of application No. 18/532,653, filed on Dec. 7, 2023, now Pat. No. 12,028,360, which is a
(Continued)

(51) Int. Cl.
| | |
|---|---|
| *H04L 9/40* | (2022.01) |
| *G06F 9/50* | (2006.01) |
| *H04L 67/1097* | (2022.01) |

(52) U.S. Cl.
CPC .......... *H04L 63/1416* (2013.01); *G06F 9/505* (2013.01); *H04L 63/0435* (2013.01);
(Continued)

(58) Field of Classification Search
None
See application file for complete search history.

(56) References Cited

U.S. PATENT DOCUMENTS

| | | | |
|---|---|---|---|
| 1,062,837 | A | 5/1913 | Mertz |
| 7,606,868 | B1 | 10/2009 | Le et al. |

(Continued)

OTHER PUBLICATIONS

Girma et al., Analysis of Security Vulnerabilities of Cloud Computing Environment Service Models and Its Main Characteristics: 2015 12th International Conference on Information Technology— New Generations Year: 2015 | Conference Paper | Publisher: IEEE.
(Continued)

*Primary Examiner* — Brandon Hoffman
(74) *Attorney, Agent, or Firm* — M&B IP Analysts, LLC

(57) ABSTRACT

A method for scalable vulnerability detection is provided. The method includes selecting at least a workload of a plurality of workloads deployed in a first cloud environment for inspection, wherein the workload includes a first volume; generating in a remote cluster an inspection node, the inspection node including at least a first disk, wherein the remote cluster provisions inspection nodes in response to demand for inspection nodes; generating a persistent volume (PV) on which the at least a first disk is mounted, wherein the at least a first disk is generated from a snapshot of the first volume; and generating a persistent volume claim (PVC) of the PV for an inspector workload, wherein the inspector workload is configured to inspect the PV for an object, and wherein inspector workloads are provisioned in response to demand for inspector workloads.

19 Claims, 4 Drawing Sheets

Related U.S. Application Data continuation of application No. 17/532,557, filed on Nov. 22, 2021, now Pat. No. 11,973,770.

(60) Provisional application No. 63/196,384, filed on Jun. 3, 2021, provisional application No. 63/123,154, filed on Dec. 9, 2020.

(52) U.S. Cl.
CPC ...... *H04L 63/0823* (2013.01); *H04L 63/1425* (2013.01); *H04L 67/1097* (2013.01)

(56) References Cited

U.S. PATENT DOCUMENTS

| | | | |
|---|---|---|---|
| 9,171,178 B1 * | 10/2015 | Banerjee ................. H04L 63/20 |
| 9,203,862 B1 | 12/2015 | Kashyap et al. |
| 9,594,881 B2 | 3/2017 | Bhargava et al. |
| 9,916,321 B2 | 3/2018 | Sundaram et al. |
| 9,934,376 B1 | 4/2018 | Ismael |
| 9,940,330 B2 | 4/2018 | Le et al. |
| 9,961,098 B2 | 5/2018 | Antony |
| 10,157,276 B2 | 12/2018 | Schilling et al. |
| 10,320,813 B1 | 6/2019 | Ahmed et al. |
| 10,601,807 B2 | 3/2020 | Sweet et al. |
| 10,649,863 B2 | 5/2020 | Kumarasamy et al. |
| 10,747,568 B2 | 8/2020 | Ahmed |
| 10,803,169 B1 | 10/2020 | Flatten et al. |
| 11,216,563 B1 | 1/2022 | Veselov et al. |
| 11,237,807 B1 | 2/2022 | Rao et al. |
| 11,409,611 B2 | 8/2022 | Sancheti |
| 11,431,735 B2 | 8/2022 | Shua |
| 11,973,770 B1 | 4/2024 | Miran et al. |
| 12,231,448 B2 | 2/2025 | Sakazi et al. |
| 12,238,140 B2 | 2/2025 | Bazalgette et al. |
| 12,248,581 B1 | 3/2025 | Shaked et al. |
| 12,333,010 B1 | 6/2025 | Berkovitz et al. |
| 12,348,540 B2 | 7/2025 | Ghalaty et al. |
| 12,518,021 B1 | 1/2026 | Berkovitz et al. |
| 2010/0138924 A1 | 6/2010 | Heim et al. |
| 2016/0072817 A1 | 3/2016 | Makhervaks et al. |
| 2017/0109536 A1 | 4/2017 | Stopel et al. |
| 2017/0220804 A1 * | 8/2017 | Muthurajan .......... G06F 21/577 |
| 2017/0345016 A1 | 11/2017 | Meek et al. |
| 2018/0324203 A1 | 11/2018 | Estes et al. |
| 2019/0042328 A1 | 2/2019 | Ortega et al. |
| 2019/0340167 A1 | 11/2019 | Raman et al. |
| 2020/0065487 A1 | 2/2020 | Timashev et al. |
| 2020/0082094 A1 | 3/2020 | Mcallister et al. |
| 2020/0159933 A1 | 5/2020 | Ciano et al. |
| 2020/0249928 A1 | 8/2020 | Zeng et al. |
| 2021/0117377 A1 | 4/2021 | Savir et al. |
| 2021/0133328 A1 | 5/2021 | Wu |
| 2021/0149788 A1 * | 5/2021 | Downie .............. G06F 11/3604 |
| 2021/0208952 A1 | 7/2021 | Jain et al. |
| 2021/0255901 A1 | 8/2021 | Hintermeister et al. |
| 2021/0263802 A1 | 8/2021 | Gottemukkula et al. |
| 2021/0303685 A1 | 9/2021 | Klonowski et al. |
| 2021/0320938 A1 | 10/2021 | Ober et al. |
| 2022/0038544 A1 | 2/2022 | Grinstein et al. |
| 2022/0129540 A1 | 4/2022 | Sheriff et al. |
| 2022/0329616 A1 | 10/2022 | O'Hearn et al. |
| 2023/0102103 A1 | 3/2023 | Mazumder et al. |
| 2023/0123477 A1 | 4/2023 | Luttwak et al. |
| 2023/0336550 A1 | 10/2023 | Lidgi et al. |
| 2023/0336554 A1 | 10/2023 | Lidgi et al. |
| 2023/0336578 A1 | 10/2023 | Lidgi et al. |
| 2023/0376586 A1 | 11/2023 | Shemesh et al. |

OTHER PUBLICATIONS

Kankhare et al., "A cloud based system to sense security vulnerabilities of web application in open-source private could IAAS," 2016 International Conference on Electrical, Electronics, Communication, Computer and Optimization Techniques (ICEECCOT) Year: 2016 | Conference Paper | Publisher: IEEE.

S. Wang et al., "THREATRACE: Detecting and Tracing Host-Based Threats in Node Level Through Provenance Graph Learning," in IEEE Transactions on Information Forensics and Security, vol. 17, pp. 3972-3987, 2022 (Year: 2022).

* cited by examiner

TECHNIQUES FOR MULTI-TENANT VULNERABILITY SCANNING UTILIZING SENSITIVE DATA

CROSS-REFERENCE TO RELATED APPLICATIONS

This application is a continuation of U.S. patent application Ser. No. 18/532,653 filed Dec. 7, 2023, which itself is a continuation of U.S. patent application Ser. No. 17/532, 557, filed Nov. 22, 2021, which in turn claims the benefit of U.S. Provisional Application No. 63/123,154 filed on Dec. 9, 2020, and of U.S. Provisional Application No. 63/196,384 filed on Jun. 3, 2021, all contents of which are hereby incorporated by reference.

TECHNICAL FIELD

The present disclosure relates generally to cybersecurity and, in particular, to techniques for multi-tenant agentless vulnerability scanning.

BACKGROUND

Cybersecurity is a field increasing in importance exponentially. As more vital functions are connected to each other and to networks around the globe, serious risk is posed when vulnerabilities are detected. Such threats may result in billions of dollars in damages, lives lost, and incapacitation of infrastructure.

Adding to that is the complexity and variety of cloud environments in which these functions, also referred to as workloads, are implemented. Traditionally, agent-based scanning was used, however, this requires active installation of agents on each workload, monitoring that the agents are indeed installed and working, and this in itself is not always effective.

Certain solutions require that a virtual appliance be placed in the cloud environment in order to scan the target workloads. Deploying a virtual appliance in the cloud environment, especially in multiple cloud environments, is not always a feasible task, especially when it comes to scale. Other solutions continuously monitor virtual workloads to detect changes therein and alert when a change is detected. However, this requires continuous monitoring and maintaining a "baseline" to which the current status of a machine can be compared to. Neither solution is particularly suited for scale, and especially not for scale across multiple cloud platforms.

Scalable solutions are important for cloud computing environments. One of the most prominent advantages of cloud computing environments is their ability to scale up and down quickly, in response to user demand for services provided by the cloud environment. Therefore, providing a solution that can easily scale in tandem with the cloud environment is especially advantageous.

It would therefore be advantageous to provide improved techniques for scanning cloud based workloads which are at least impervious to the complexity and variety of the different cloud environments and technologies which may be used to deploy the workloads, and can be scaled up or down to meet demand.

SUMMARY

A summary of several example embodiments of the disclosure follows. This summary is provided for the con-venience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for scalable vulnerability scanning of compute workload. The method comprises: selecting at least a workload of a plurality of workloads deployed in a first cloud environment for inspection, wherein the workload includes a first volume; generating in a remote cluster an inspection node, the inspection node including at least a first disk, wherein the remote cluster provisions inspection nodes in response to demand for inspection nodes; generating a persistent volume (PV) on which the at least a first disk is mounted, wherein the at least a first disk is generated from a snapshot of the first volume; and generating a persistent volume claim (PVC) of the PV for an inspector workload, wherein the inspector workload is configured to inspect the PV for an object, and wherein inspector workloads are provisioned in response to demand for inspector workloads.

Certain embodiments disclosed herein also include a non-transitory computer readable medium having stored thereon causing a processing circuitry to execute a process, the process comprising: selecting at least a workload of a plurality of workloads deployed in a first cloud environment for inspection, wherein the workload includes a first volume; generating in a remote cluster an inspection node, the inspection node including at least a first disk, wherein the remote cluster provisions inspection nodes in response to demand for inspection nodes; generating a persistent volume (PV) on which the at least a first disk is mounted, wherein the at least a first disk is generated from a snapshot of the first volume; and generating a persistent volume claim (PVC) of the PV for an inspector workload, wherein the inspector workload is configured to inspect the PV for an object, and wherein inspector workloads are provisioned in response to demand for inspector workloads.

Certain embodiments disclosed herein also include a system for scalable vulnerability detection. The system comprises: a processing circuitry; and a memory, the memory containing instructions that, when executed by the processing circuitry, configure the system to: select at least a workload of a plurality of workloads deployed in a first cloud environment for inspection, wherein the workload includes a first volume; generate in a remote cluster an inspection node, the inspection node including at least a first disk, wherein the remote cluster provisions inspection nodes in response to demand for inspection nodes; generate a persistent volume (PV) on which the at least a first disk is mounted, wherein the at least a first disk is generated from a snapshot of the first volume; and generate a persistent volume claim (PVC) of the PV for an inspector workload, wherein the inspector workload is configured to inspect the PV for an object, and wherein inspector workloads are provisioned in response to demand for inspector workloads.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
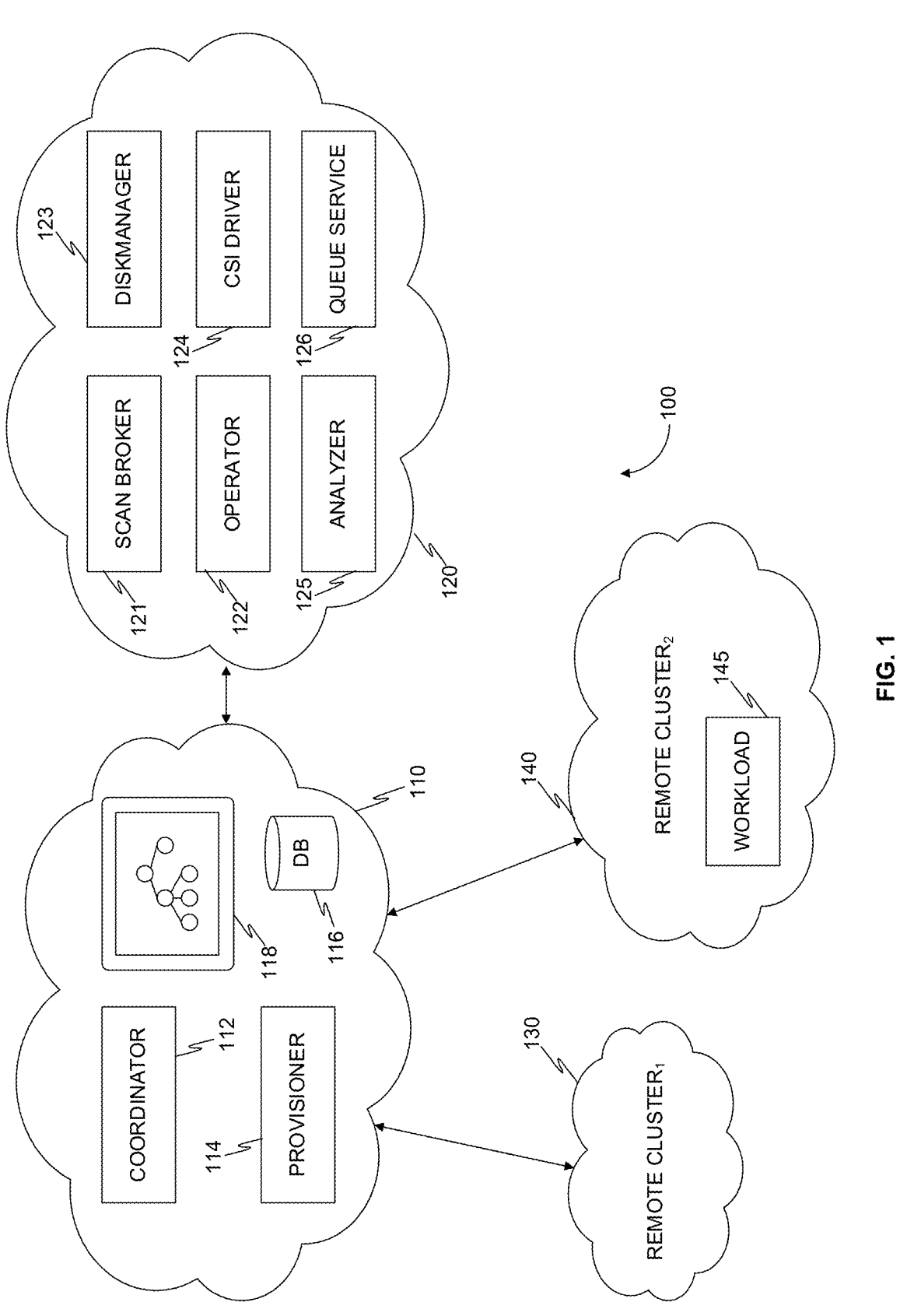
FIG. 1 is a schematic illustration of a multi-tenant inspection architecture utilizing a container orchestration system, implemented in accordance with an embodiment

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A cloud computing environment is disclosed which implements methods of inspecting virtual workloads, such as virtual machines, containers, and serverless functions. The inspecting environment is implemented in a cloud computing environment which supports container technology, allowing to efficiently scale the inspecting environment based on demand. Inspection workloads can be spun up in response to demand for inspecting workloads in a production environment, and spun down when inspection is done. Each inspector workload may inspect for at least one type of data object.

FIG. 1 is a schematic illustration of a multi-tenant inspection architecture 100 utilizing a container orchestration system, implemented in accordance with an embodiment. The architecture 100 includes a local cluster 110, a remote inspection cluster 120, and may optionally include one or more remote clusters, such as first remote cluster 130 and second remote cluster 140. In some embodiments the architecture 100 may further include a remote cloud environment on which workloads such as containers, virtual machines and serverless functions are deployed.

A cluster (such as any of the clusters 110, 120, 130, and 140) may be provisioned one or more physical machines for executing containerized applications. A cluster includes at least one machine which may execute one or more containers, and a control plane for controlling nodes (e.g., deploying new nodes) and communicating with an API of the cloud environment in which the cluster operates. For example, a Kubernetes® engine (container engine) running in an Amazon® Web Services (AWS) cloud environment may utilize an API of the control plane to communicate with a cloud control manager, which in turn communicates with a cloud provider API, in this case AWS API. Clusters may be in the same cloud environment, different cloud environments, or some may be in a first cloud environment while others are in a second cloud environment. A cloud environment may be, for example, AWS, Microsoft® Azure, or Google® Cloud Platform (GCP).

The local cluster 110 includes a coordinator 112 and a provisioner 114. The coordinator 112 and provisioner 114 may be implemented as workloads in the cloud environment, for example as applications each running on a software container. The local cluster 110 further includes a database 116 and a graph store 118. The database 116 may include a table in which data is stored to identify workloads in the local cluster 110, in any of the remote clusters, or a combination thereof. The table may include, for each workload, a name in a namespace, a local network address, a global network address, and an indicator (such as a flag) if the workload should be scanned or not.

The graph store 118 may be used to store a security graph. A security graph may have a plurality of nodes, each node corresponding to a principal (such as a user account, service account, user group, role, etc.), or a resource (such as a VM, container, serverless function, and the like), and one or more connections (vertices) between a principal and a resource. The security graph may be used to represent each element of a cloud environment which is associated with the local cluster 110, enrichments generated based on information received from the cloud environment, enrichments based on inspection of the contents of a workload, or a combination thereof.

A coordinator 112 is a microservice which initiates inspection of workloads. The coordinator 112 may initiate inspection periodically, at predefined times, in response to user requests, or any combination thereof. The coordinator 112 may query the database 116 to determine what workloads should be inspected or otherwise scanned. The database 116 may generate of response including a list of workloads, such as virtual machines, containers, serverless functions, and the like, which should be inspected. One or more of the workloads to be inspected may be implemented, for example, the remote inspection cluster 120, in a first remote cluster 130, second remote cluster 140, or any combination thereof.

The coordinator 112 is configured to send a request to a provisioner 114 microservice, for data pertaining to one or more remote clusters, such as remote cluster 130 or remote cluster 140. The provisioner 114 can locate and direct the coordinator 112 to workloads on remote clusters. If a cluster is not deployed, the provisioner 114 can provision the cluster. For example, the coordinator 112 is configured to determine that a first workload should be inspected, in this example, the workload is a virtual machine having a first volume. A node corresponding to the workload should be deployed in a remote cluster, and a second volume, generated from a snapshot of the first volume, should be attached thereto. In an embodiment a node may be assigned a plurality of second volumes. The second volume is generated in order to inspect the content of the first volume, without interrupting production (i.e., operation of the first volume). However, if the cluster of the node does not exist, the provisioner 114 is configured to provision a remote cluster (such as the second remote cluster 140), which in turn deploys a node to which the second volume, generated from a snapshot of the first volume, can be mounted.

The coordinator 112 is configured to generate an inspection message for the workloads that should be inspected. For example, the coordinator 112 may generate an inspection message indicating that a workload 145 in the second remote cluster 140 should be inspected. The workload may be, for example, a virtual machine, container, or serverless function. An inspection message may be generated for each workload, or for a group of workloads. The inspection message is sent to a queue of a queue service in the remote inspection cluster 120. The queue service may be implemented differently in various cloud environments. For example, Simple Queue Service (SQS) in AWS, Service Bus in Azure, and Pub/Sub in Google Cloud.

The remote inspection cluster 120 includes an inspection broker 121, an operator 122, a disk manager 123, a Container Storage Interface (CSI) driver 124, an analyzer 125, and a queue service 126. The queue service 126 is configured to receive inspection messages from the coordinator 112. An inspection message may include an address, name, and the like of a workload that should be inspected.

The inspection broker 121 is configured to receive the inspection messages. The inspection broker 121 is configured to send an instruction to the operator 122, which generates at least a disk scan custom resource for each inspection message. While this implementation utilizes an inspection broker 121, it is apparent that other approaches may be used to alert the operator 122 that a disk scan resource requires handling.

The disk manager 123 is configured to generate a volume for a scannable container. This may be achieved by accessing a virtual workload which is designated as to be inspected, generating a snapshot of each volume attached to the virtual workload, generating a volume in a remote cluster (such as remote cluster 130) based on the snapshot, and mounting the volume to a container in a cluster, the cluster provisioned by the provisioner 114. The disk manager 123 is configured to send a message to the operator 122 with an identifier, such as a volume ID, for the volume which the disk manager 123 generated. The operator 122 is further configured to generate a persistent volume (PV) for the generated volume.

In an embodiment, the CSI driver 124 can attach the generated PV, or a plurality of PVs, to a node which is assigned for inspecting, and mount the PV on the node. In some embodiments the operator 122 may generate an analyzer 125, which is a pod which inspects the disk. The analyzer 125 may have a persistent volume claim (PVC) to the PV of the volume which needs to be inspected.

The analyzer 125 (also referred to as an inspector, or inspector workload) may then inspect for one or more object types, such as secrets, nested workloads (e.g., workloads deployed within workloads), applications, certificates, policies, and the like. The analyzer 125 may send a message with an inspection result to the operator 122. The inspection result may include objects which are discovered, metadata pertaining to the discovered objects, object identifiers, and the like.

The operator 122 sends the inspection result to the local cluster 110, and the scan result is used to update the security graph 118. Updating the security graph 118 may include generating nodes and vertices which correspond to objects discovered by the analyzer 125. Generation of a security graph is discussed in more detail in U.S. Non-Provisional patent application Ser. No. 17/524,410, the contents of which are incorporated by reference herein.

In an embodiment, the remote inspection cluster 120 may be implemented in a cloud environment in which workloads are implemented for inspecting. In some embodiments, the remote inspection cluster 120 may be implemented in the same cloud environment as the local cluster 110. It should be apparent that while a single remote inspection cluster 120 is illustrated here, this is merely for pedagogical purposes, and a plurality of remote inspection clusters may each communicate with the local cluster 110. In such embodiments, a security graph may be generated based on a shared data schema for each of the remote scanning clusters.

In an embodiment, an analyzer 125 is configured to exchange data, including during the execution of inspection processes and inspection of raw volumes, where such exchanged data may include potentially sensitive data. In some embodiments, the graph database 116 is configured to store only environment metadata, and further configured not to store sensitive data.

According to an embodiment, an analyzer is configured to read, from the local cluster 110, cloud metadata on a cloud account, including, without limitation, network configurations, IAM configurations, asset inventories, and the like, as well as any combination thereof. Such reading may be limited to control-plane configuration data, with no sensitive data accessed or transmitted.

Further, in an embodiment, the inspection cluster 120 is configured to receive metadata and security findings from the platform account of the local cluster 110, where such metadata and security findings include, for example, findings, such as packages, versions, misconfigurations, and the like.

The architecture described above is based on container technology and provides a solution which scales together with the cloud environment, or multiple cloud environments. The solution provides for multitenancy since the remote scanning cluster can be used to scan workloads for different clients. For example, a first client may have workloads deployed in a first cloud environment and a second client may have workloads deployed in a second cloud environment. Remote clusters in which scannable containers are deployed may be spun up or down depending on real time demand. Thus, the solution is also cost effective as resources are provisioned on the fly and only paid for when in actual use. This is a clear advantage over solutions which require, for example, multiple scanner appliances which are constantly deployed in a cloud environment.

Figure 2:
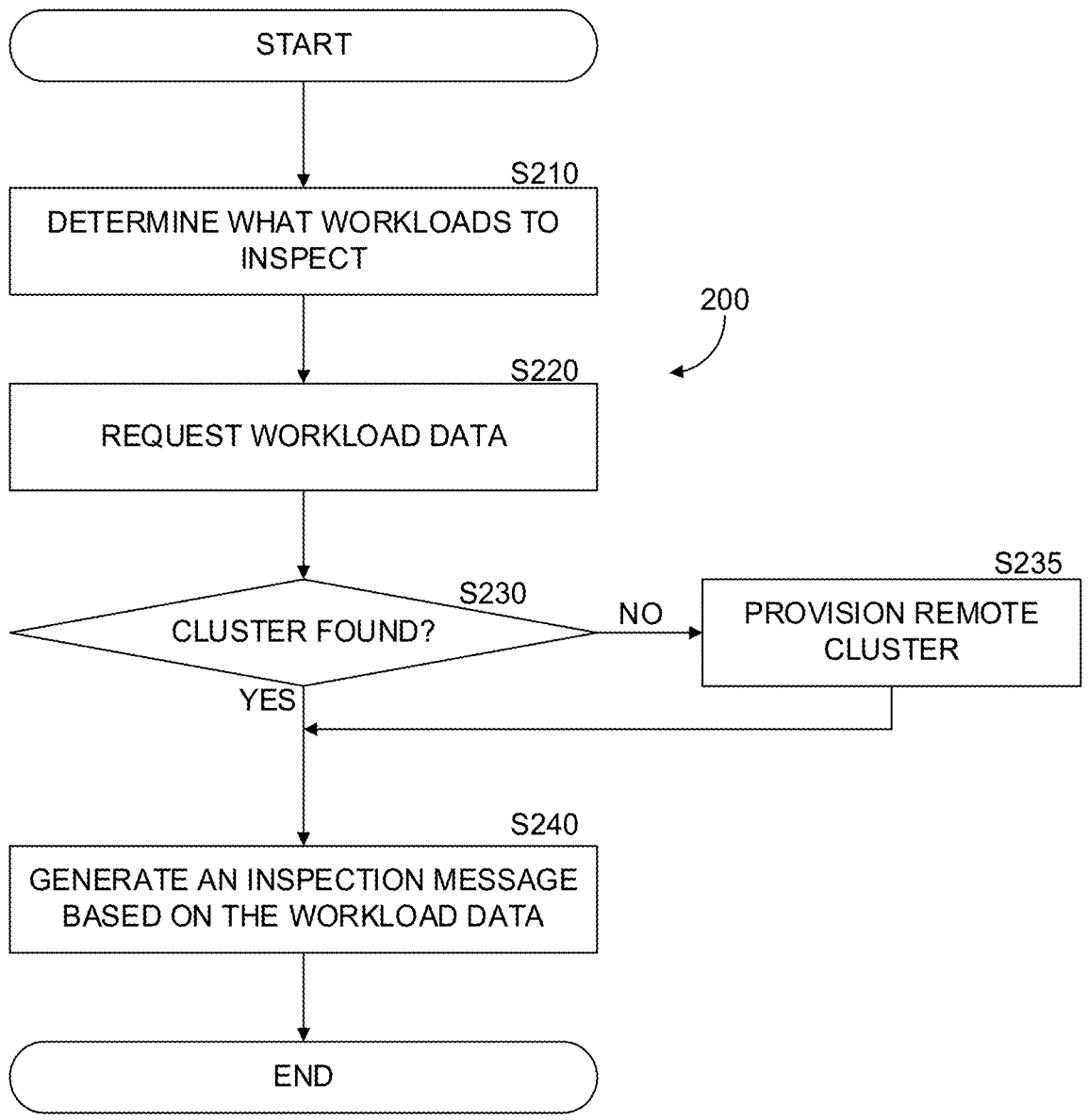
FIG. 2 is a flowchart of a method for provisioning resources in a remote cluster, implemented in accordance with an embodiment.

FIG. 2 is an example flowchart 200 of a method for provisioning resources in a remote cluster, implemented in accordance with an embodiment.

At S210, a check is performed to determine what workload(s) should be inspected. In an embodiment a coordinator, such as the coordinator 112 of FIG. 1, determines what workloads should be inspected. A coordinator may be implemented as a microservice in a container environment The workloads may be deployed in a local cloud environment, remote cloud environment, on-premises (on-prem) network environment, local cluster, remote cluster, or any combination thereof. Determining what workloads require inspection may include querying a database containing a table of workload identifiers, network addresses, names in a namespace, and the like, all used to identify a unique workload in a network environment. The query result returned may include workloads such as virtual machines, containers, serverless functions, and the like.

At S220 workload data for each of the determined workloads is requested. In an embodiment, a coordinate may request the workload data from the provisioner. The provisioner may store the workload data, for example in the database where the workload identifiers are stored. The provisioner may further store a list of remote clusters. A remote cluster may include at least a container for analyzing a workload. Analyzing a workload includes generating a snapshot of a volume of the workload, generating a node in a remote cluster, generating a new volume based on the snapshot of the volume, and mounting the new volume on the node.

At S230, a check is performed to determine if a remote cluster exists on which there is a node which may be dedicated to inspect a determined workload. In an embodiment, the check may be performed by the provisioner which may further check for each determined workload if there is a dedicated node, one or more nodes for each workload, one or more workloads for each node, or any combination thereof. If 'yes' execution continues at S240, otherwise execution continues at S235.

At S235, a remote cluster is provisioned in response to determining that a remote cluster does not exist for a workload for which a determination has been made that the workload requires inspection. The remote cluster may deploy a node for inspecting by instructing the control plane of the cluster to deploy a node. In an embodiment, each remote cluster may auto-scale and be self-managing.

At S240, an inspection message is generated based on the received workload data. In an embodiment, the workload data is received from the provisioner. The inspection message is sent to the remote cluster on which a node is deployed dedicated to inspect the workload.

Figure 3:
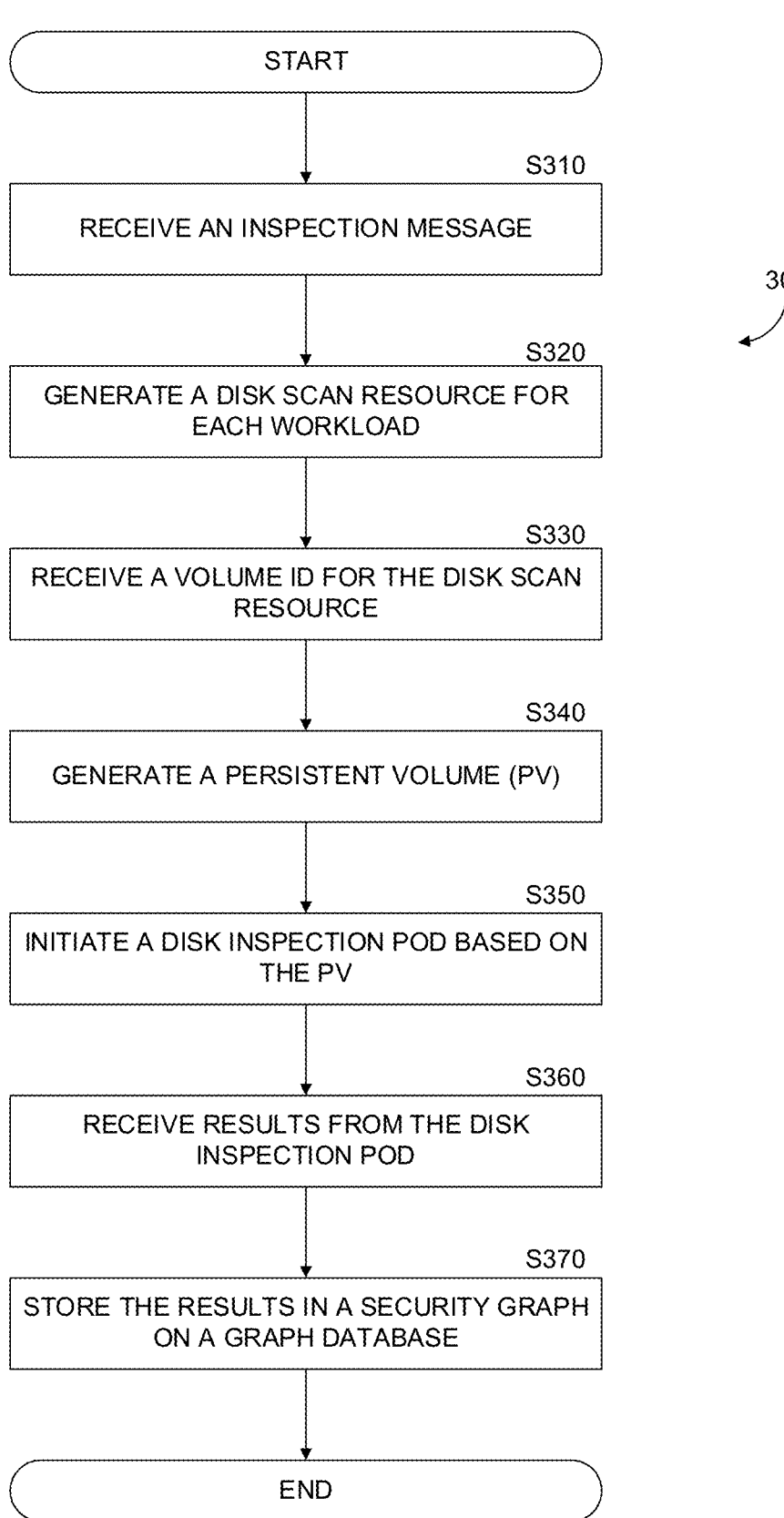
FIG. 3 is a flowchart of a method for analyzing a workload in a remote cluster, implemented in accordance with an embodiment.

FIG. 3 is an example flowchart 300 of a method for analyzing a workload in a remote cluster, implemented in accordance with an embodiment. In an embodiment, the method is performed by the remote inspection cluster 120.

At S310, an inspection message is received. The inspection message may be generated by a coordinator, such as described in FIG. 2 above. The inspection message may include an identifier of a node on a remote cluster and an identifier of a workload for inspecting the contents thereof.

At S320, a disk scan resource is generated. A notification may be generated by a scan broker and received by the operator to indicate that a disk scan resource should be generated. A disk scan resource may be implemented as a storage resource in a cluster. In an embodiment, the disk scan resource is generated by a disk manager service. A disk manager service may provision physical storage resources as virtual storage devices, in order to generate a disk scan resource, which may include one or more such virtual storage devices.

At S330, a volume identifier (ID) is generated for each disk generated for the disk scan resource. A generated disk may be based off a snapshot from a volume of a workload. The volume identifier may be sent to the operator, for example, by a disk manager service.

At S340, a persistent volume (PV) for the generated disk is generated. In an embodiment, the PV may be generated by the operator. A persistent volume is a storage resource which is provisioned in a cluster. Optionally, a CSI driver, implemented as a microservice in each different cloud environment, attaches the PV to the node used for inspection, and mounts the PV on the node.

At S350, a pod is generated for disk inspection, with a persistent volume claim (PVC) on the PV. The PVC is a request to access a storage resource. A pod is a set of containers running on a cluster. For example, each container of the inspection pod may include an inspection application which inspects a workload for different types of objects, such as secrets, policies, applications, nested workloads, and the like.

At S360, results from the disk inspection pod are received. Results may be received as objects, which may be used to generate vertices for a graph database. Objects may also be files, such as text files, containing passwords, certificates, and other information used for authenticating network communication, IAM data, and the like.

At S370, at least a portion of the received results are stored in a graph database containing a security graph. Storing results may include generating a node in the security graph, wherein the node is generated based on a predefined schema of the security graph. In other embodiments storing results may include generating a vertex connecting a first node to a second node.

Figure 4:
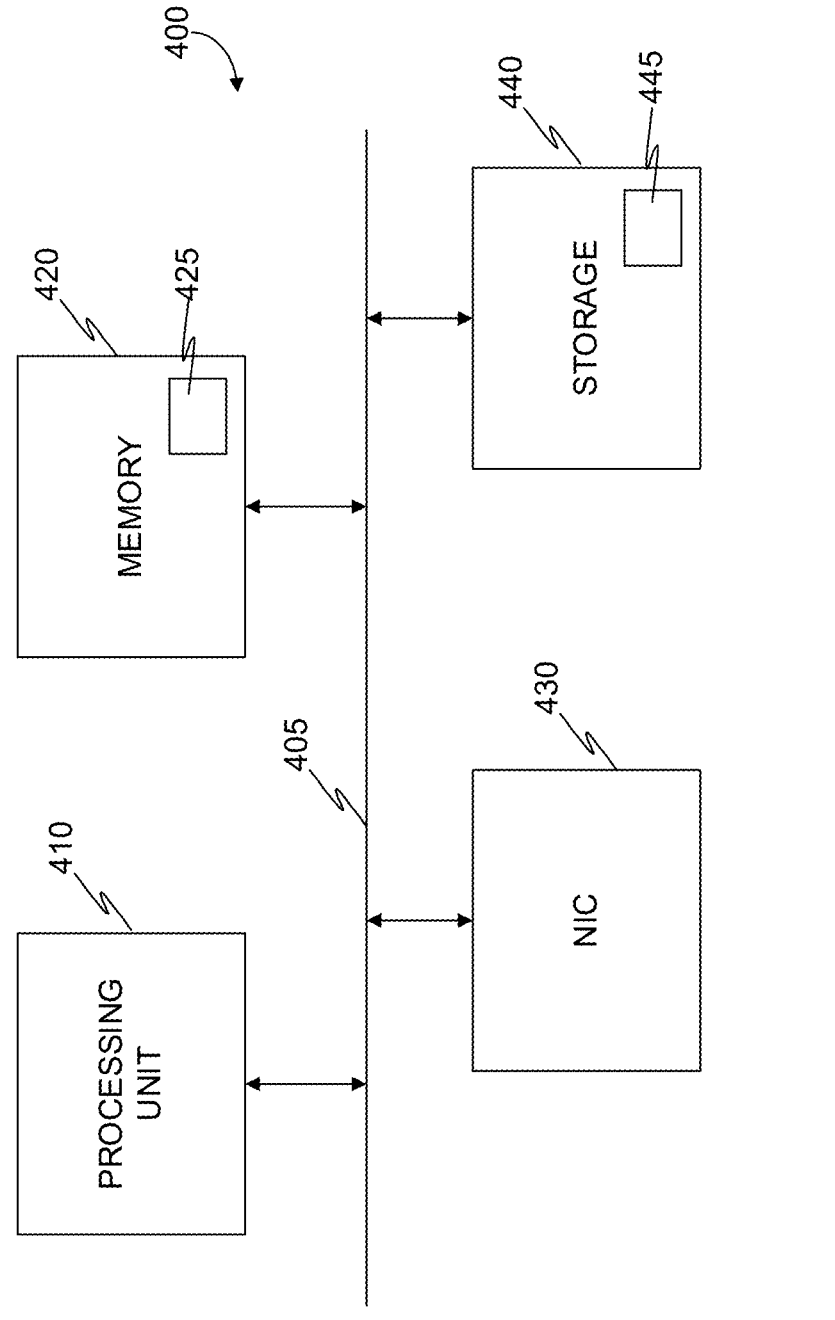
FIG. 4 is a schematic block diagram of a physical machine 400 utilized to execute service deployed on a container engine in a cloud environment, implemented in accordance with an embodiment.

FIG. 4 is a schematic illustration of a physical machine 400 utilized to execute a service deployed on a container engine in a cloud environment, implemented in accordance with an embodiment. The physical machine 400 includes at least one processing element 410, for example, a central processing unit (CPU). In an embodiment, the processing element 410 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing element 410 is coupled via a bus 405 to a memory 420. The memory 420 may include a memory portion 425 that contains instructions that when executed by the processing element 410 performs the method described in more detail herein. The memory 420 may be further used as a working scratch pad for the processing element 410, a temporary storage, and others, as the case may be. The memory 420 may be a volatile memory such as, but not limited to random access memory (RAM), or non-volatile memory (NVM), such as, but not limited to, Flash memory.

The processing element 410 may be coupled to a network interface controller (NIC) 430, which provides connectivity to one or more cloud computing environments, via a network.

The processing element 410 may be further coupled with a storage 440. Storage 440 may be used for the purpose of holding a copy of the method executed in accordance with the disclosed technique. The storage 440 may include a storage portion 445 containing objects received from a disk inspection pod, as explained in more detail above.

The processing element 410 and/or the memory 420 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

Each physical component, such as the processing element 410, memory 420, NIC 430, and storage 440 may be provisioned by the container engine to the control plane of a cluster, which in turn provisions some or all of the physical component to a node deployed therein.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting a vulnerable entity having sensitive data deployed in a computing environment, comprising:

initiating inspection of a workload deployed in a computing environment for a cybersecurity object;

detecting the cybersecurity object on the workload;

determining that the workload is a vulnerable workload;

initiating inspection of the workload for sensitive data in response to determining that the workload is vulnerable; and storing a representation of the workload, the vulnerability, and the sensitive data in a security database.

2. The method of claim 1, further comprising:

provisioning an inspector configured to inspect for the cybersecurity object.

3. The method of claim 1, further comprising:

provisioning an inspector configured to inspect for sensitive data.

4. The method of claim 1, further comprising:

detecting a disk associated with the workload;

generating a copy of the disk; and initiating inspection on the copy of the disk.

5. The method of claim 4, further comprising:

generating a persistent volume claim (PVC) to the copy of the disk.

6. The method of claim 5, further comprising:

releasing the PVC in response to determining that inspection is complete.

7. The method of claim 1, further comprising:

detecting a security finding on the workload.

8. The method of claim 7, wherein the security finding is any one of: a package, a version, a misconfiguration, and a combination thereof.

9. The method of claim 1, further comprising:

inspecting the workload for any one of: a secret, a nested workload, an application, a certificate, a policy, a data object, a file, an IAM configuration, a network configuration, an asset inventory, and a combination thereof.

10. A non-transitory computer-readable medium storing a set of instructions for detecting a vulnerable entity having sensitive data deployed in a computing environment, the set of instructions comprising:

one or more instructions that, when executed by one or more processors of a device, cause the device to:

initiate inspection of a workload deployed in a computing environment for a cybersecurity object;

detect the cybersecurity object on the workload;

determine that the workload is a vulnerable workload;

initiate inspection of the workload for sensitive data in response to determining that the workload is vulnerable; and store a representation of the workload, the vulnerability, and the sensitive data in a security database.

11. A system for detecting a vulnerable entity having sensitive data deployed in a computing environment comprising:

a processing circuitry;

a memory, the memory containing instructions that, when executed by the processing circuitry, configure the system to:

initiate inspection of a workload deployed in a computing environment for a cybersecurity object;

detect the cybersecurity object on the workload;

determine that the workload is a vulnerable workload;

initiate inspection of the workload for sensitive data in response to determining that the workload is vulnerable; and store a representation of the workload, the vulnerability, and the sensitive data in a security database.

12. The system of claim 11, wherein the memory contains further instructions which when executed by the processing circuitry further configure the system to:

provision an inspector configured to inspect for the cybersecurity object.

13. The system of claim 11, wherein the memory contains further instructions which when executed by the processing circuitry further configure the system to:

provision an inspector configured to inspect for sensitive data.

14. The system of claim 11, wherein the memory contains further instructions which when executed by the processing circuitry further configure the system to:

detect a disk associated with the workload;

generate a copy of the disk; and initiate inspection on the copy of the disk.

15. The system of claim 14, wherein the memory contains further instructions which when executed by the processing circuitry further configure the system to:

generate a persistent volume claim (PVC) to the copy of the disk.

16. The system of claim 15, wherein the memory contains further instructions which when executed by the processing circuitry further configure the system to:

release the PVC in response to determining that inspection is complete.

17. The system of claim 11, wherein the memory contains further instructions which when executed by the processing circuitry further configure the system to:

detect a security finding on the workload.

18. The system of claim 17, wherein the security finding is any one of:

a package, a version, a misconfiguration, and a combination thereof.

19. The system of claim 11, wherein the memory contains further instructions which when executed by the processing circuitry further configure the system to:

inspect the workload for any one of:

a secret, a nested workload, an application, a certificate, a policy, a data object, a file, an IAM configuration, a network configuration, an asset inventory, and a combination thereof.

* * * * *